US005295620A

United States Patent [19]

Cousineau et al.

[11] Patent Number: 5,295,620

[45] Date of Patent: Mar. 22, 1994

[54] EXTENDABLE ARM FOR POWER AND IMPACT TOOLS

[76] Inventors: B. Robert Cousineau, P.O. Box 8341 Station T, Ottawa Ontario, Canada, K1G 3H8; Mark W. Forest, 3196 Olympic Way, Gloucester, Ontario, Canada, K1P 1Z1

[21] Appl. No.: 960,492

[22] Filed: Oct. 13, 1992

[51] Int. Cl.[5] .............. B23B 45/14

[52] U.S. Cl. .............. 227/156; 173/170; 408/136

[58] Field of Search .............. 173/170; 227/156; 254/131.5, 131; 408/136, 234, 712

[56] References Cited

U.S. PATENT DOCUMENTS

| | | | |
|---|---|---|---|
| 2,405,110 | 8/1946 | Bullock | 408/136 |
| 2,578,995 | 12/1951 | Emrick | 408/136 |
| 2,653,006 | 9/1953 | Lewis | 254/131 |
| 2,879,677 | 3/1959 | Baublitz | 408/136 |
| 3,035,816 | 5/1962 | Conant | 254/131.5 |
| 4,281,949 | 8/1981 | Bugarin . | |
| 4,442,905 | 4/1984 | Agoston | 408/136 |
| 4,494,895 | 1/1985 | Leaf . | |
| 4,523,882 | 6/1985 | Hengesbach . | |
| 4,736,804 | 4/1988 | Geibel | 408/136 |
| 4,793,646 | 12/1988 | Michaud, Jr. . | |
| 4,820,090 | 4/1989 | Chen . | |
| 4,848,817 | 7/1989 | Hasegawa . | |
| 4,975,004 | 12/1990 | Sharpe . | |

FOREIGN PATENT DOCUMENTS

| | | |
|---|---|---|
| 635543 | 1/1962 | Canada . |
| 825571 | 10/1969 | Canada . |
| 1048307 | 2/1979 | Canada . |
| 1218543 | 3/1987 | Canada . |

*Primary Examiner*—Scott Smith

*Attorney, Agent, or Firm*—Henderson & Sturm

[57] ABSTRACT

The extendable arm of the present invention enables the drilling of holes and installation of fasteners in ceilings directly by an operator standing on the floor below the ceiling. The arm has a foot-actuated lever, a telescopic pole, and a tool cradle. The power or impact tool is mounted on the tool cradle and is brought into contact with the ceiling by depressing the foot-actuated lever which raises the telescopic pole and thereby the tool cradle. Means for remotely actuating the trigger of the impact tool are also disclosed.

12 Claims, 9 Drawing Sheets

EXTENDABLE ARM FOR POWER AND IMPACT TOOLS

FIELD OF THE INVENTION

The present invention relates to an apparatus for drilling holes and installing fasteners in ceilings, and more particulary to an extendable arm for power and impact tools which enables the drilling of holes and installation of fasteners in a ceiling directly by an operator standing on the floor below the ceiling.

BACKGROUND OF THE INVENTION

In many construction projects, holes are drilled in structural concrete ceilings and other overhead structures, hereinafter referred to as ceilings, for subsequent installation of fasteners for plumbing, electrical and communications wiring, false ceilings, and sprinkler systems. In other cases these fasteners are applied, without pre-drilling of a hole, by an impact tool which uses an explosive charge to propel the fastener into the ceiling. Typically, these operations are conducted while other construction work is being carried out at the work site.

The conventional manner of conducting these operations is to use a hand-held power or impact tool while the operator is standing on a ladder or a scaffold erected at the work site. Scaffolds are often quite large and can obstruct other construction work at the site while in use. Often, the scaffold must first be assembled at one location and after the hole is drilled or the fastener is installed in the ceiling, the operator must dismount the scaffold to move it to another location, and at times, the scaffold must be disassembled and then reassembled at the next location. Assembly and disassembly of the scaffold is very time-consuming and awkward at busy construction sites. Even if the scaffold is equipped with rollers or castors, the scaffold is quite cumbersome and a large path must be cleared in order to allow the scaffold to be moved from one location to another. While it is possible for a single operator to move the scaffold on rollers or castors to another location, this step is very time-consuming and inconvenient.

Alternatively the operator can use a ladder to reach the ceiling. The operation however is still very time-consuming even though the ladder is more readily assembled and moved than is the scaffold. The operator must put the ladder in position and then climb the ladder with the power or impact tool to drill the hole or install the fastener. The operator must then dismount the ladder with the tool, bend over to put the tool on the floor, and move the ladder to the next position. He must then return to the previous position to pick up the power or impact tool and repeat the procedure.

It will be -Appreciated by those skilled in the art, that when the holes or fasteners are to be positioned, on the average, four feet apart, the scaffold or ladder must be moved many times during the project. For each hole or fastener, there is expended much non-productive time for both the operator and other workers in the vicinity.

Furthermore, the drilling of holes in structural concrete ceilings by means of a hand-held drill from a swaying scaffold or ladder is awkward and very hard work. The operator is exposed to noise, dust, and vibrations during the drilling operation and, all the while, he must hold his arms above his head. This type of work is very tiring and cannot be carried out for long periods. This problem is compounded in the use of the impact tool because more force is required to propel the fastener into the ceiling. If the operator loses his balance on the swaying ladder or scaffold during the operation, the tool may fall to the ground injuring workers in the vicinity or worse, the operator may fall off the ladder or scaffold.

Canadian Patent Number 1,218,543 (Klingstedt et al) describes a bore frame, upon which a power drill can be mounted, to enable the drilling of holes in ceilings directly from the floor below. The bore frame has an adjustable tubular body and a tool holder which is connected by a wire over a guide pulley to a handle hingedly attached to the outer tube of the tubular body. In this embodiment of the Klingstedt device, the tool holder moves relative to the tubular body of the bore frame.

In operation of the power drill mounted on the Klingstedt bore frame, the operator must stabilize the tubular body with one hand while operating the handle with the other hand. When the handle is depressed, the chain is guided over the pulley to move the tool holder and the drill upwards to the ceiling. A switch is located on the tubular body for operation of the power drill. The operator must activate this switch with the same hand that is used to stabilize the tubular body. Simultaneously, the handle must be depressed gradually with the other hand to control the feed of the drill.

It will be understood by those skilled in the art that, as the drilling operation continues with one hand holding the tubular body and the other hand depressing the handle, the operator's body must bend sideways into a very awkward position. This position of the body could be very painful for many people with back problems, especially after repeating this movement many times in one day. In fact, it may be impossible for some people to move their body in this position particularly while operating the power drill. The operator may even lose his balance in operation of this device. The safety of the operator and other workers at the site could be at risk.

As the drilling operation continues the operator's hands are further distanced from each other and the body position becomes very awkward making it easy for the operator to cause the drill to move sideways unintentionally. Moreover, the hand that is used to stabilize the frame is not totally dedicated to the stability of the frame as it must also be used to activate the switch. This could seriously affect the safety of the operator and other workers at the construction site. The device of the Klingstedt patent is also equipped with a level on the tubular body, presumably to prevent this unintentional movement of the drill. As discussed previously however it could be very difficult for the operator to view the level while simultaneously looking at the ceiling to monitor the operation.

In another embodiment of the bore frame described in Canadian Patent Number 1,218,543, the tool holder is rigidly attached to the tubular body which is movable in a sleeve at the base of the tubular body. The operating handle is hingedly attached to both the base sleeve and the tubular body. Again, the operator must stabilize the tubular body with one hand while operating the handle with the other hand. When the handle is depressed the tubular body moves upward relative to the base sleeve. The drill is operated by pulling a chain with the same hand that is also stabilizing the tubular body to cause a yoke to activate the switch on the drill. The operator must use one hand to push the operating handle in a downwards direction and the other hand to pull a chain causing operation of the drill. Once again the operator is forced into a very awkward position as he bends sideways to operate the handle. The problems discussed earlier are even further compounded in this embodiment because the tubular body is moved upward by depressing the handle. The hand that is stabilizing the tubular body and operating the switch also rises with the tubular body as the other hand pushes the handle downward. Stability of the bore frame and the safety of the operator are very serious concerns.

The present invention overcomes the problems of the prior art by enabling the drilling of holes or the installation of fasteners by an impact tool in a ceiling directly by an operator standing on the floor below the ceiling. The extendable arm of the present invention is convenient for the operator as it can be moved from one location to another by a single operator. The operator is able to stabilize the apparatus with both hands while operating the drill. The operation is more accurate and safer for both the operator and other workers at the construction site.

SUMMARY OF THE INVENTION

The extendable arm of the present invention enables the drilling of holes with a power drill or the installation of fasteners with an impact tool into a ceiling directly from a floor below said ceiling. The arm has a telescopic pole, a tool cradle, and a foot-actuated lever. The telescopic pole is made of lengths of tubing having a sliding fit with locking means to hold the pole at a predetermined length. The tool cradle is detachably connected to the upper end of the telescopic pole and is held in relative position thereon by locking means. Securing means hold the power drill or impact tool in position in the tool cradle. The foot-actuated lever is hingedly connected to the lower end of the telescopic pole. When the lever is depressed, the telescopic pole and the tool cradle are raised to bring the tool proximate the ceiling.

The foot-actuated lever has a leg, a fulcrum, and a pedal. In a preferred embodiment the lever is formed so that it is substantially U-shaped in profile, one end of the U-shape forming a leg hingedly connected to the lower end of the telescopic pole, the other end forming a pedal, and the bend forming a fulcrum.

The extendable arm can be provided with a switch mounted on the telescopic pole to connect the power drill to an electrical source.

When the invention is used with an impact tool, the impact tool can be remotely actuated by an actuating means consisting of a rod having a first end adapted to engage the trigger of the impact tool, and a second end extending upwardly proximate the tip of the impact tool. The rod is slidably received in a sleeve attached to a mounting bracket which is secured to the tool cradle. The rod is held in relative position between the trigger and the tip of the impact tool by resilient means. When the lever is depressed, the telescopic pole and the tool cradle are raised to bring the tool and the second end of the rod proximate the ceiling. Upon further depressing the lever, the rod is moved downwardly against the resilient means to depress the trigger of the impact tool.

Alternatively, the impact tool could be remotely actuated by an actuating means consisting of a hook adapted to engage the trigger of the impact tool, means for holding the hook in tension, a handle, and connecting means such as a cable for connecting the hook and the handle. When the impact tool is proximate the ceiling, the handle is pulled downwardly to cause the hook to depress the trigger of the impact tool.

BRIEF DESCRIPTION OF THE DRAWINGS

In the accompanying drawings which illustrate preferred embodiments of the present invention.

DESCRIPTION OF THE PREFERRED EMBODIMENTS

Figure 1:
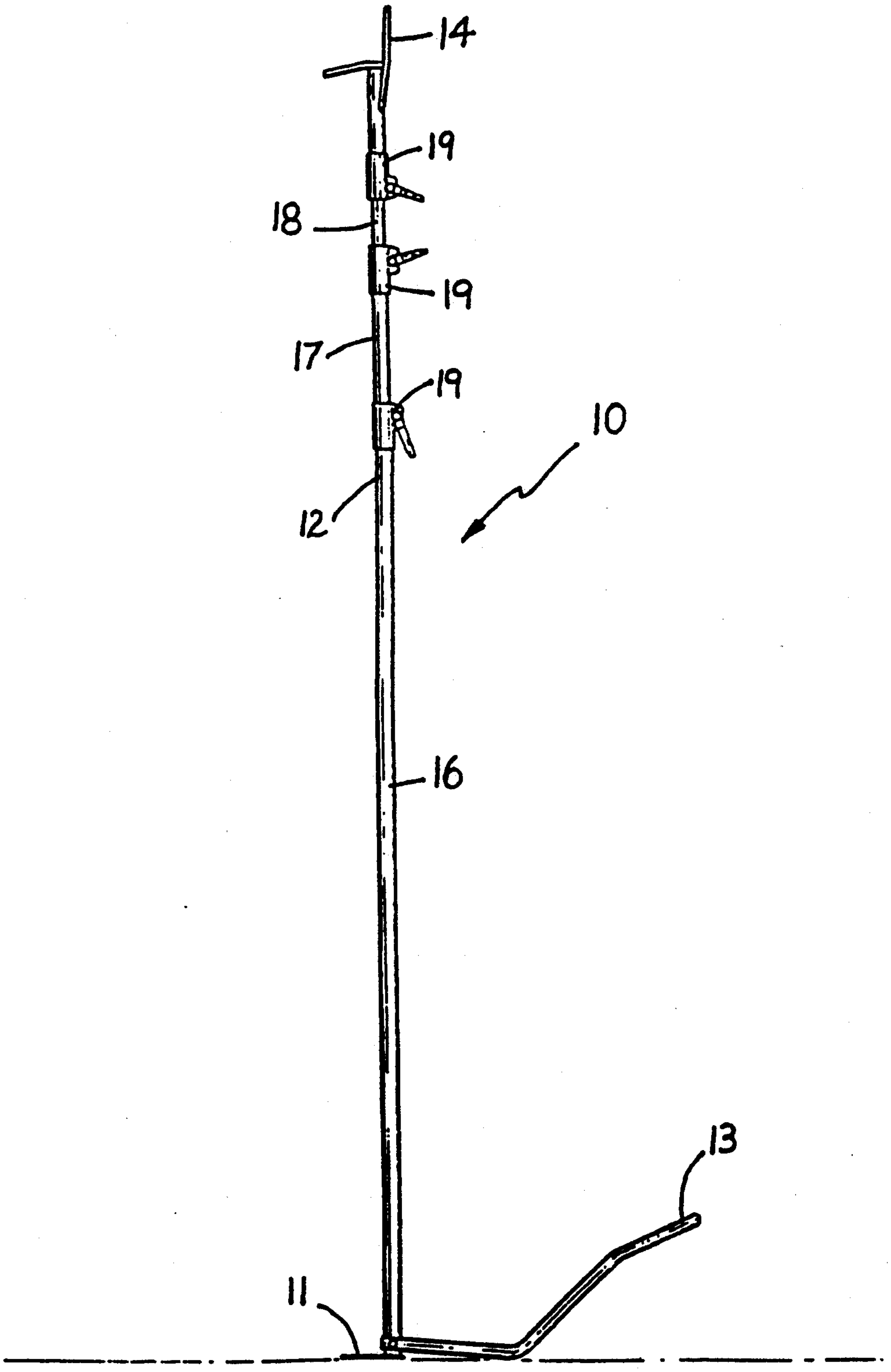
FIG. 1 is a side elevational view of the extendable arm of the present invention.

FIG. 1 illustrates the extendable arm 10 of the present invention. The arm 10 is comprised of a platform 11, a telescopic pole 12, a foot-actuated lever 13, and a tool cradle 14.

The platform 11 provides stability for the extendable arm 10 when positioning the arm 10 on the floor below the ceiling. The platform 11 can be formed of a steel plate with a thickness of $\frac{1}{8}$ inch and having dimensions of 6 inches by 4 inches or some other dimensions and thickness which would provide stability during positioning of the extendable arm 10.

The telescopic pole 12 may be fixedly attached to the platform 11 by welding. The pole 12 is adjustable in length and is comprised of a support tube 16, an intermediate tube 17, and an extension rod 18.

The support tube 16, the intermediate tube 17, and the extension rod 18 are dimensioned to provide a sliding fit therebetween. For example, the support tube 16 is formed of steel tubing with an outer diameter of 1.125 inch, an inner diameter of 1.027 inch, and a length of 66 inches while the intermediate tube 17 is formed of steel tubing with an outer diameter of 1.0 inch, an inner diameter of 0.902 inch, and a length of 78 inches. The extension rod 18 could be formed of a solid steel rod or steel tubing having a length of 84 inches and an outer diameter of 0.875 inch.

The minimal annular space between the support tube 16 the intermediate tube 17 and between the intermediate tube 17 and the extension rod 18 provides stability in the telescopic pole 12 even when the extension arm is extended, for example, to 16 feet.

The intermediate tube 17 is slidably connected to the support tube 16 by a locking means such as a locking collar 19. The extension rod 18 is also slidably connected to the intermediate rod 17 by a locking means such as a locking collar 19. The locking collars 19 allow the telescopic pole 12 to be adjusted to the required length. The support and intermediate tubes 16, 17 and the extension rod 18 are slidably moved with respect to each other and are held in relative position to each other by the locking collars 19.

Alternatively, the tubes 16, 17 and rod 18 can be held in relation to each other by holes (not shown) drilled through the tubes 16, 17 and rod 18 and a pin (not shown) extending through the holes.

Figure 2:
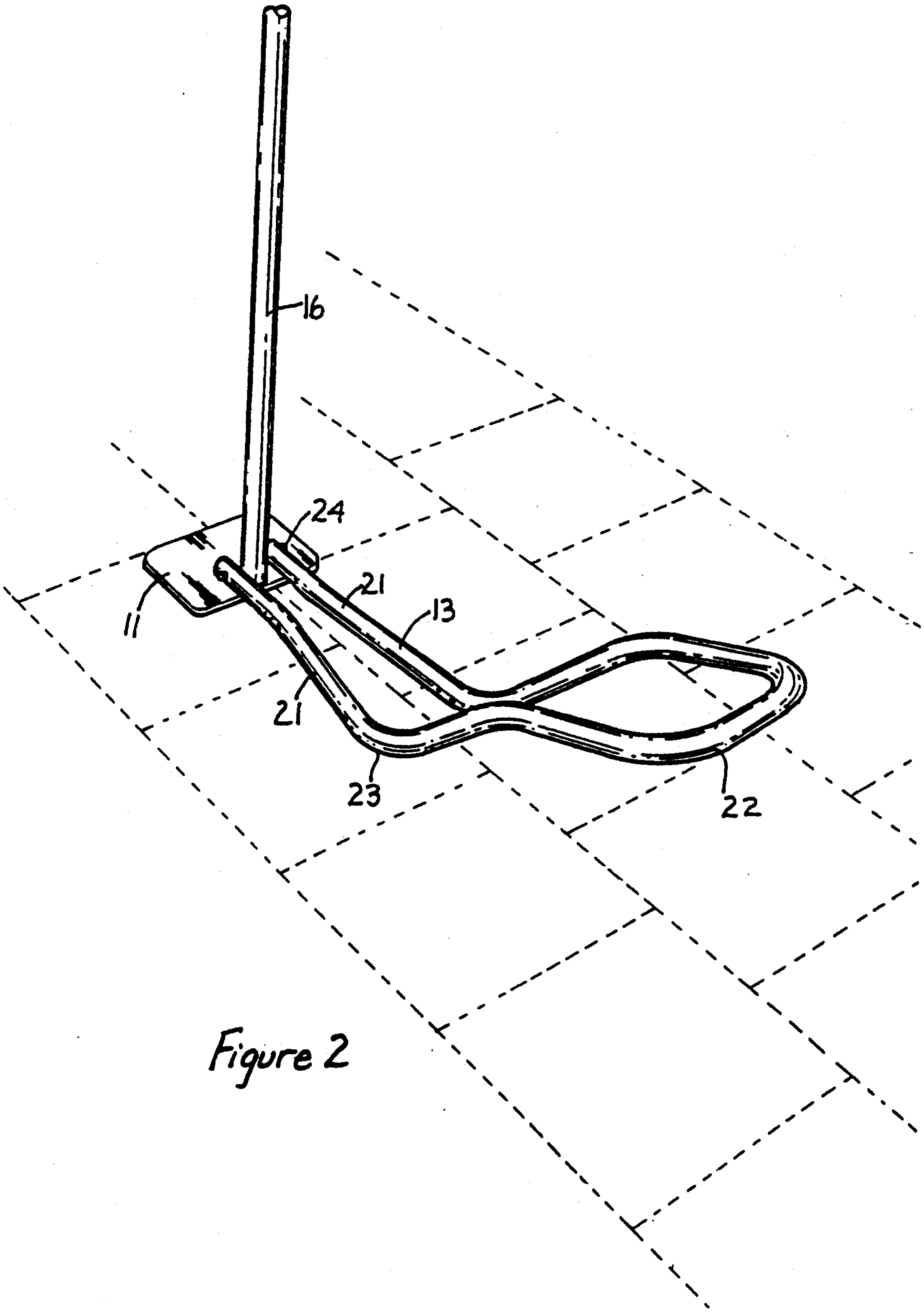
FIG. 2 is a perspective view of the bottom portion of the extendable arm of FIG. 1.

Referring now to FIG. 2, the foot-actuated lever 13 can be formed of steel tubing bent into a shape having two legs 21 at one end and a pedal 22 at the other end. The lever 13 is movably connected to the lower end of the telescopic pole 12 by a pivot pin 24. The pivot pin 24 extends through both legs 21 of the lever 13 and through the support tube 16. The legs 21 of the lever 13 extend substantially horizontally from the support tube 16. The substantially U-shaped bend in the lever 13 at a point between the legs 21 and the pedal 22 acts as a fulcrum 23 so that when pressure is applied to the pedal 22, the legs 21 are pushed upwardly thereby raising the telescopic pole 12. In the embodiment shown in FIG. 2 the legs 21, fulcrum 23, and pedal 22 are formed as a unitary structure. A foot plate (not shown) could be welded over the top of the pedal 22.

Alternatively, the lever 13 could be formed of a straight length of tubing or rod (not shown) hingedly attached to the telescopic pole 12 at one end and to a fulcrum (not shown) at some point on the lever. The fulcrum could be formed, for instance, of a straight piece of tubing or rod having a platform which rests on the floor.

While a number of variations are possible, the lever 13 should be hingedly attached to the telescopic pole 12 and be provided with a fulcrum and a pedal of some sort. In the preferred embodiment, the pedal 22 is shaped to provide a rise of approximately 6 inches.

Figure 3:
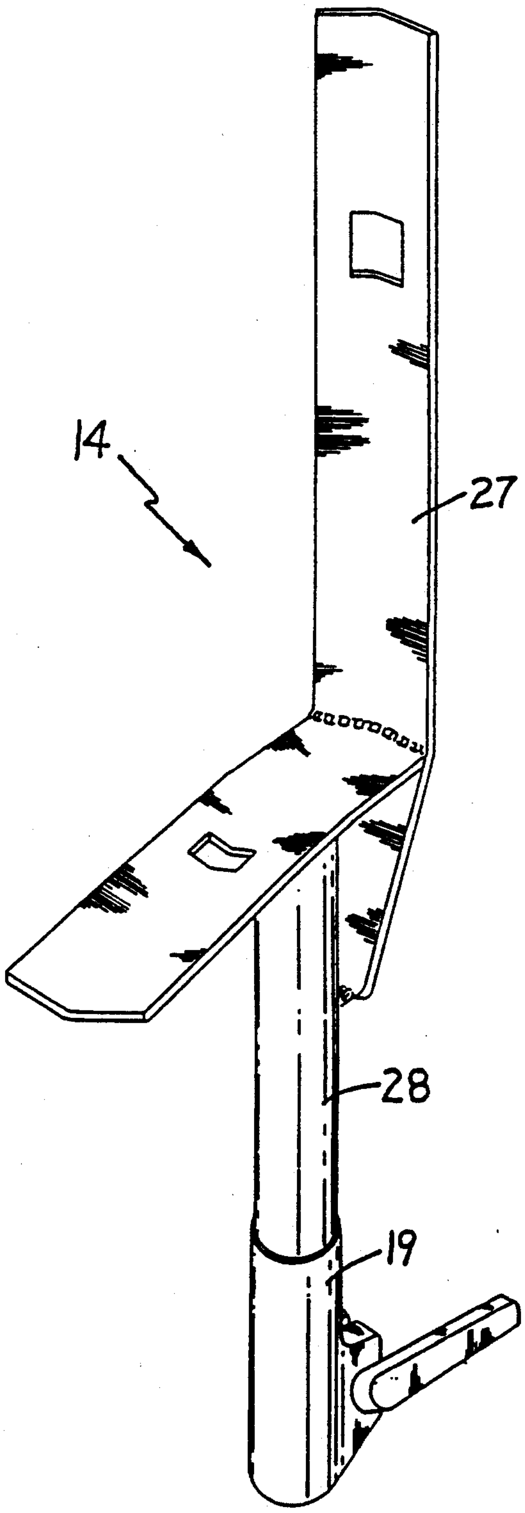
FIG. 3 is a perspective view of the tool cradle of the extendable arm of FIG. 1.
Figure 4:
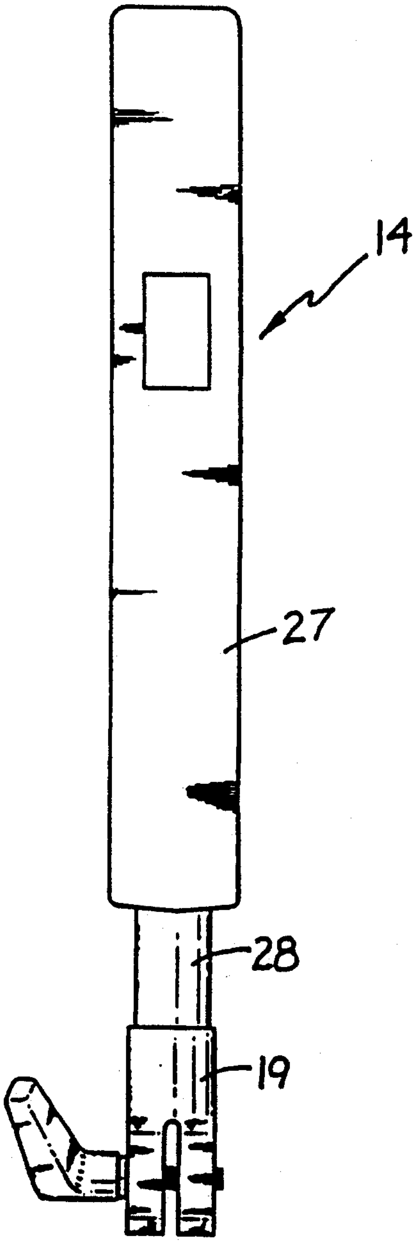
FIG. 4 is a rear elevational view of the tool cradle of FIG. 3.

Referring now to FIGS. 3 and 4, the tool cradle 14 is comprised of a bracket 27, a mounting tube 28, and a locking means such as a locking collar 19. The inside faces of the bracket 27 are slightly curved or bent to accommodate a power or impact tool. The mounting tube 28 is dimensioned for a sliding fit with the extension rod 18. For example, the mounting tube 28 could be formed of steel with an outer diameter of 1.0 inch and an inner diameter of 0.902 inch and a length of 6 inches. The tool cradle 14 is mounted on the upper end of the telescopic pole 12 by insertion of the extension rod 18 into the mounting tube 28 and locked into place with the locking collar 19.

Figure 5:
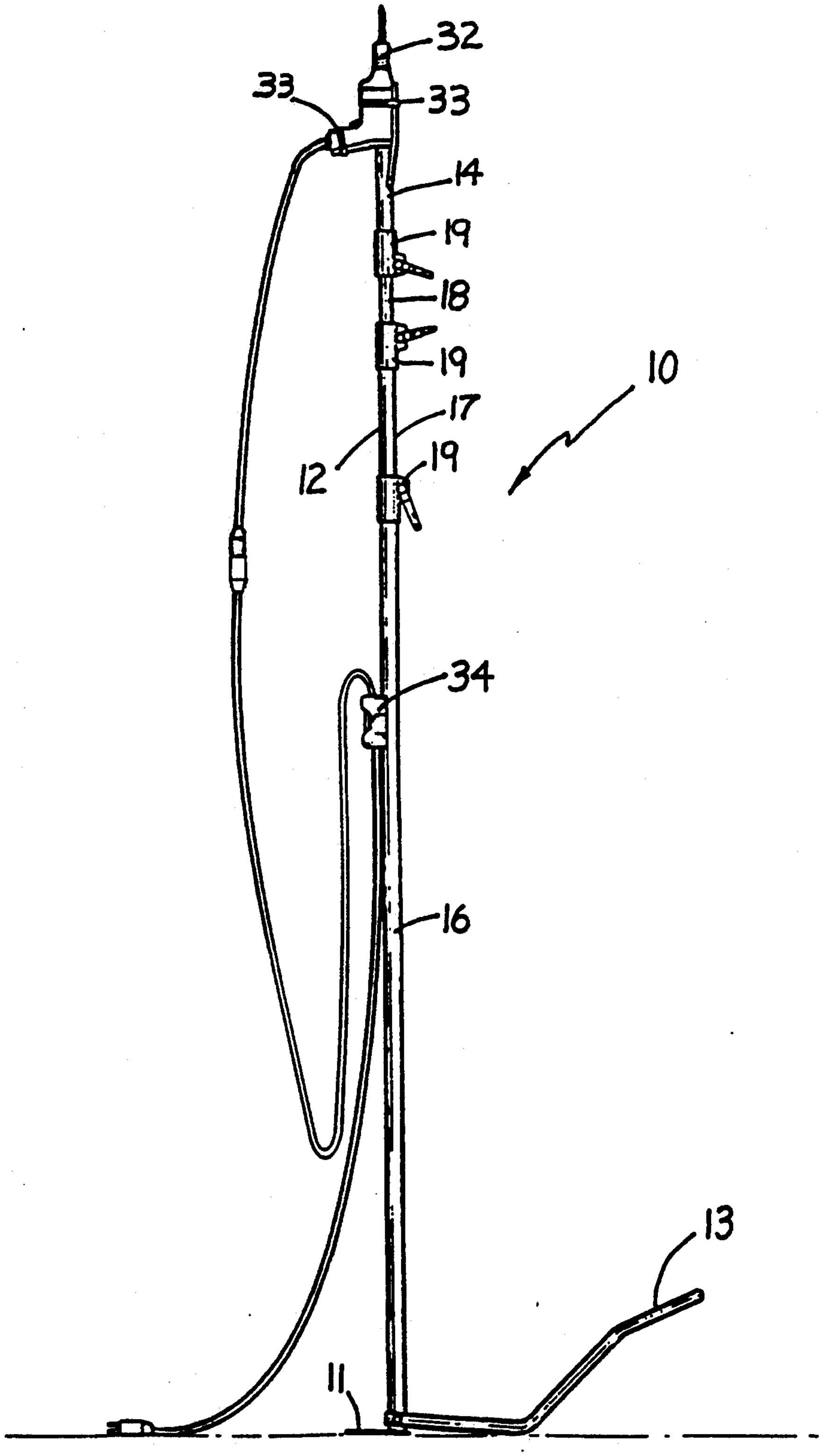
FIG. 5 is a side elevational view of the extendable arm of FIG. 1 showing a power drill mounted on the tool cradle of FIG. 3.
Figure 6:
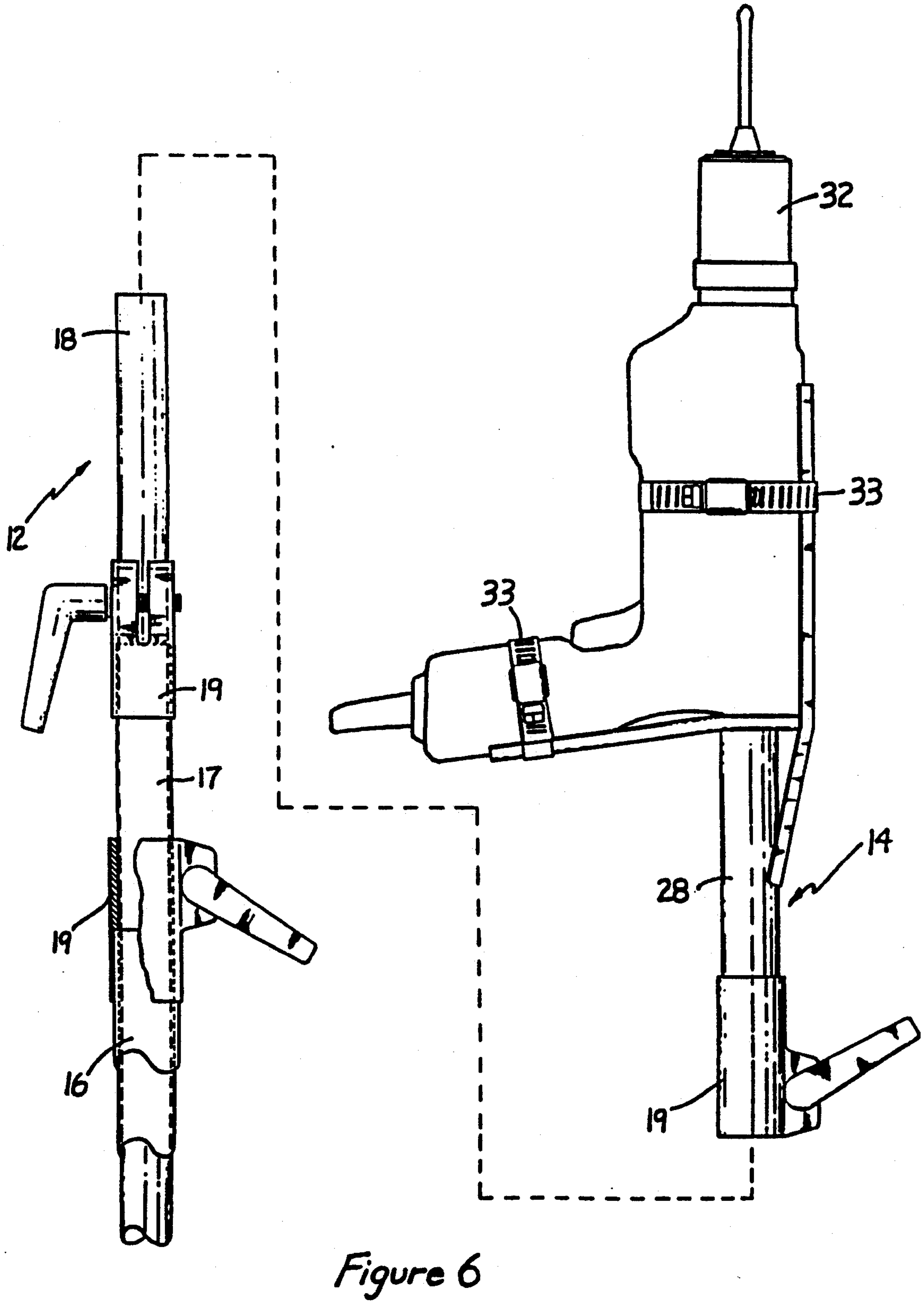
FIG. 6 is a side elevational view of the tool cradle of FIG. 3 supporting a power drill and showing the assembly of the tool cradle on the telescopic pole.
Figure 7:
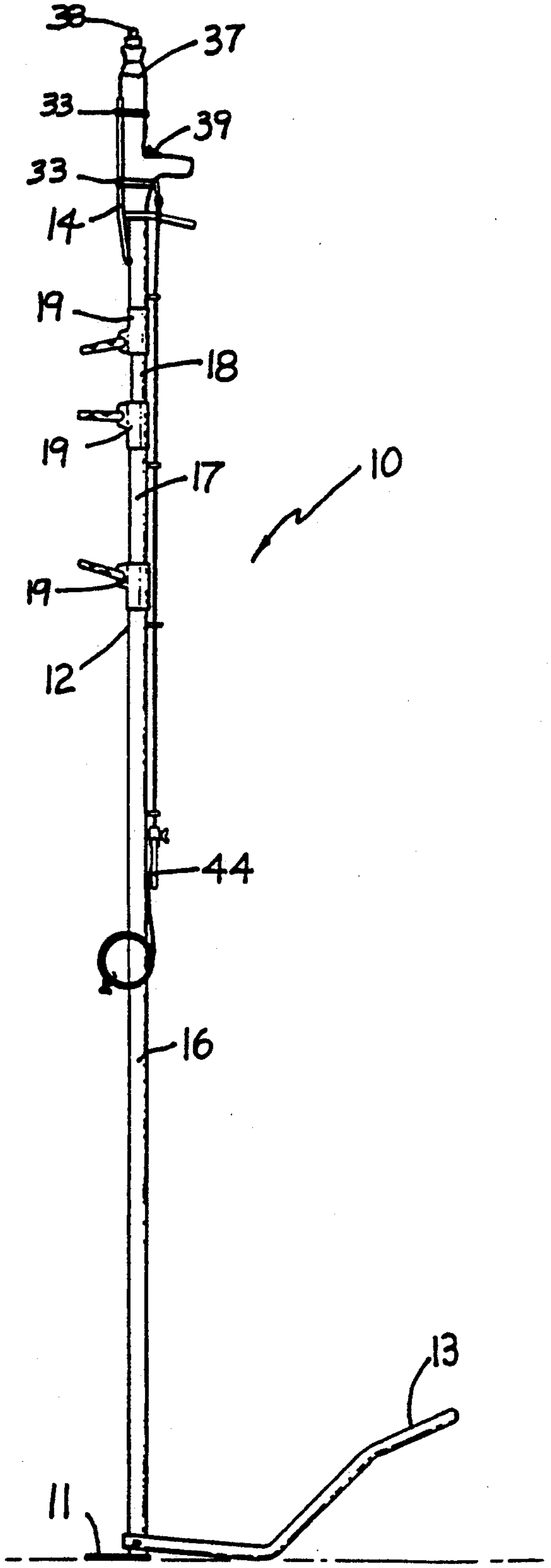
FIG. 7 is a side elevational view of the extendable arm of FIG. 1 showing an impact tool mounted on the tool cradle of FIG. 3.
Figure 9:
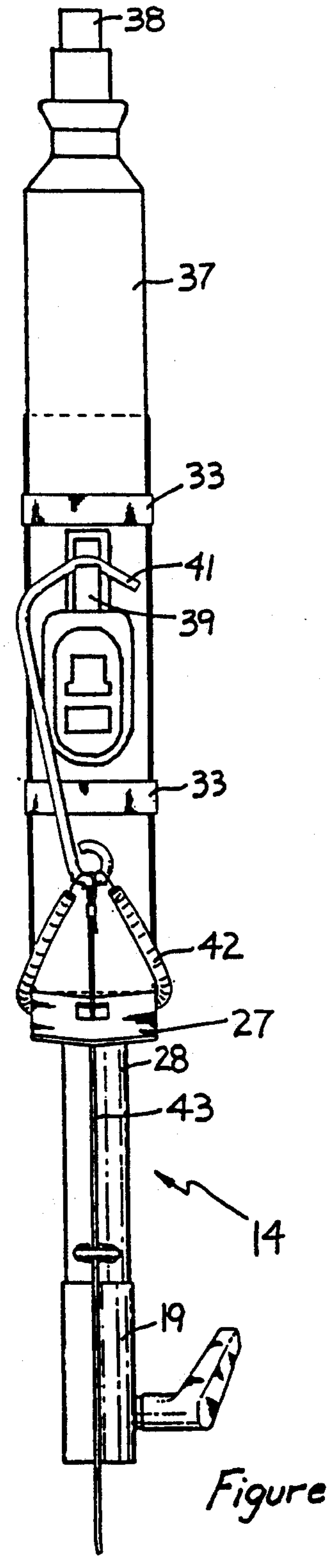
FIG. 9 is a front elevational view of the tool cradle of FIG. 8.
Figure 8:
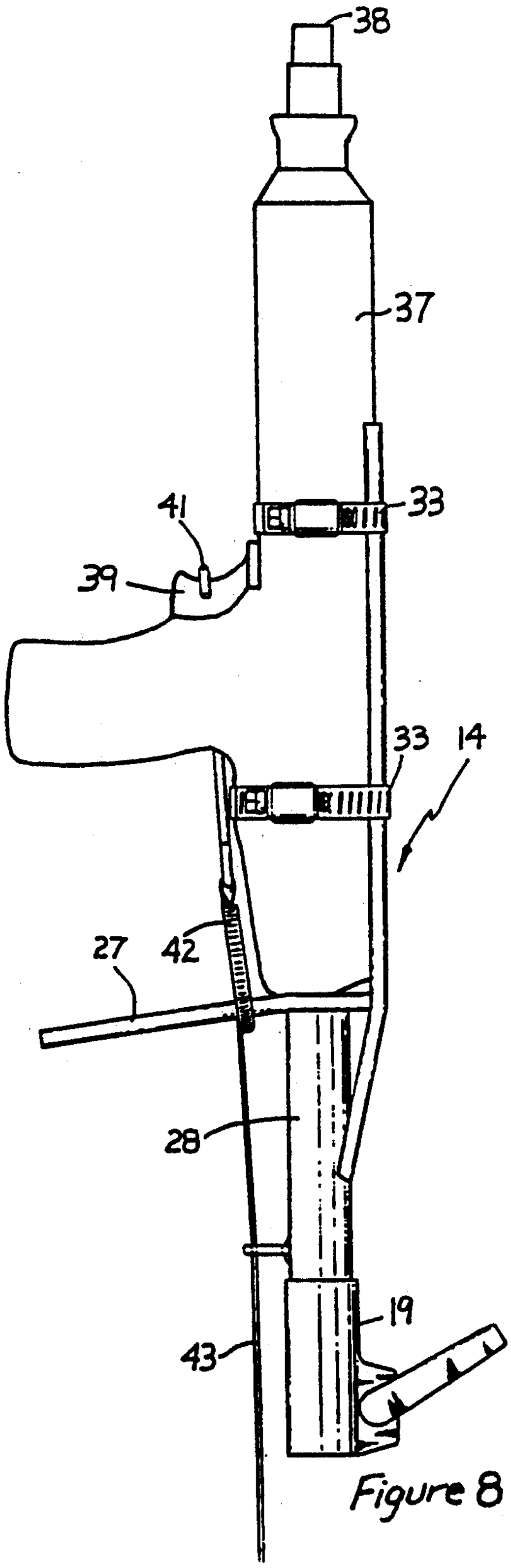
FIG. 8 is a side elevational view of the tool cradle of FIG. 3 supporting an impact tool.
Figure 10:
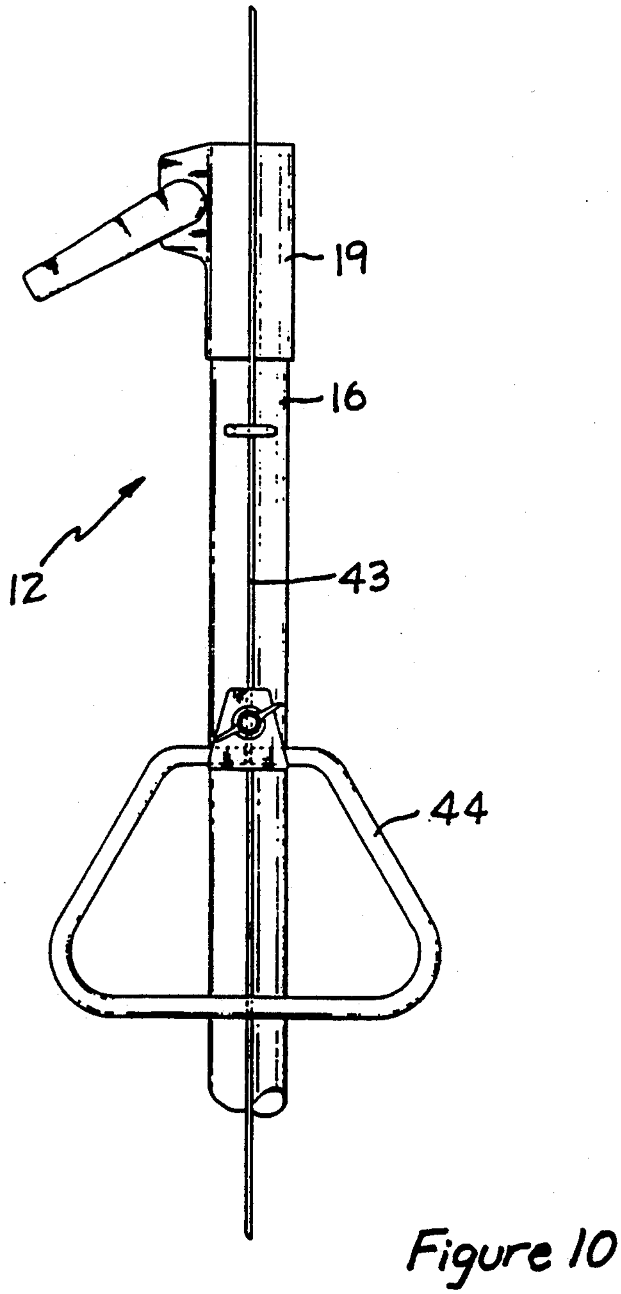
FIG. 10 illustrates a portion of the telescopic pole adapted with a handle for operation of the impact tool of FIGS. 7 and 8.

FIGS. 5 and 6 illustrate the extendable arm 10 of the present invention with a power drill 32 mounted on the tool cradle 14. The power drill 32 is secured to the tool cradle 14 with a securing means such as ring clamps 33 and is electrically connected to a switch 34 on the support tube 16. The extendable arm 10 is relatively lightweight, weighing approximately 25 pounds with a power drill 32 mounted thereon. The extendable arm 10 is easily carried by a sole operator from position to position.

In operation, the extendable arm 10 with the power drill 32 mounted thereon is positioned upright on the floor below the desired location of a hole. The length of the telescopic pole 12 is then adjusted at the locking collars 19 so that there is, for example, a clearance of 1 inch between the ceiling and the tip of the drill bit of the drill 32. The operator holds the extendable arm 10 in an upright position with two hands, one of which is located proximate the switch 34 on the support pole 16. The operator depresses the foot-actuated lever 13 with one foot to cause the power drill 32 to move upwardly to the ceiling. Simultaneously the switch 34 is activated and the lever 13 is further depressed to control the feed of the power drill 32. As the operator is using one foot to control the feed of the power drill 32, he is able to hold the extendable arm 10 in position with both hands. When the hole in the ceiling is of the desired depth, the operator releases the lever 13 to allow the platform 11 to return to the floor. The operator then moves the extendable arm 10 to the next position.

FIGS. 7 through 10 illustrate the extendable arm 10 of the present invention with an impact tool 37 mounted on the tool cradle 14. An example of such an impact tool 37 is made by Hilti of Germany. This impact tool 37 is designed with a safety feature to prevent unintentional firing of the fasteners. A fastener is installed into a structural ceiling or wall by bringing the tip 38 of the impact tool 37 into contact with the ceiling or wall. The impact tool 37 is pressed against the surface thereby depressing the tip 36 and cocking the firing mechanism (not shown) of the impact tool 37. The trigger 39 is then depressed and an explosive charge propels the fastener into the structural ceiling or wall. Pressing the trigger 39 when the firing mechanism of the impact tool 37 is not cocked will not activate the explosive charge to discharge the fastener.

The impact tool 37 is secured to the tool cradle 14 with a securing means such as ring clamps 33. Whereas the switch on the power drill 32 can be electrically connected to the switch 34 on the support tube 16, the trigger 39 of the Impact tool 37 is mechanical and requires pressure for actuation. In the embodiment Shown in FIGS. 7 through 10, the trigger 39 of the impact tool 37 is remotely activated by an actuating means consisting of a hook 41 secured to the tool cradle 14 by tension means such as a spring 42, and connecting means such as a cable 43 secured at its other end to a handle 44 on the support tube 16.

In operation, the extendable arm 10 with the impact tool 37 mounted thereon is positioned upright on the floor below the desired location of a fastener. The length of the telescopic pole 12 is then adjusted at the locking collars 19 so that there is, for example, a clearance of 2 inches between the ceiling and the top of the impact tool 37. The operator holds the extendable arm 10 in an upright position with two hands, one of which is located proximate the handle 44 on the support pole 16.

The operator depresses the foot-actuated lever 13 with one foot to cause the impact tool 37 to move upwardly to the ceiling and to push the tip 38 inwardly to cock the firing mechanism. The fastener is then propelled into the ceiling by pulling the handle 44 downwardly. As the operator is using one foot to control the height of the impact tool 37, he is able to hold the extendable arm 10 in position with both hands. When the fastener is installed, the operator releases the lever 13 to allow the platform 11 to return to the floor. The operator then moves the extendable arm 10 to the next position.

Figure 12:
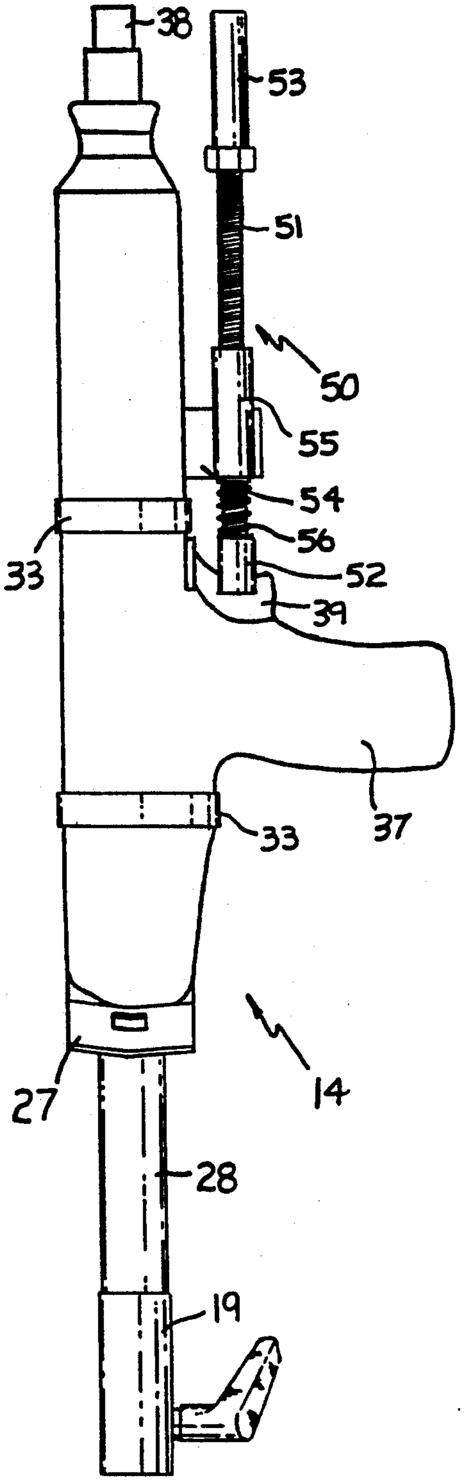
FIG. 12 is a front elevational view of the tool cradle and impact tool with the actuating means of FIG. 11.
Figure 11:
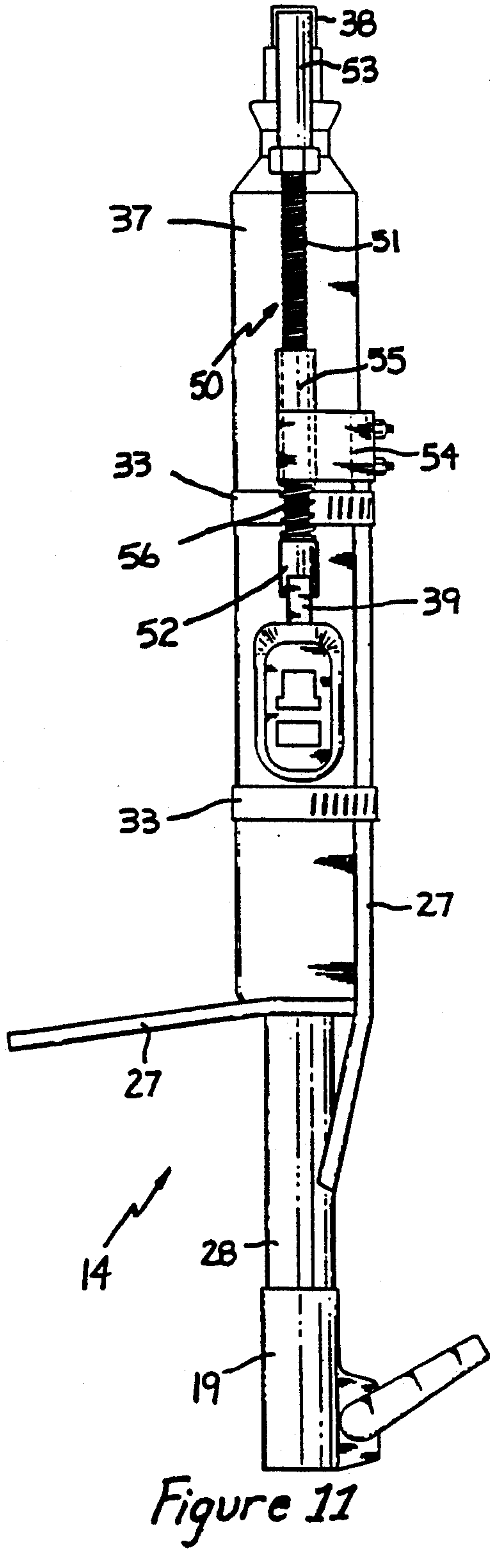
FIG. 11 is a side elevational view of the tool cradle and impact tool of FIGS. 8 and 9 illustrating an actuating means for automatically firing the impact tool.

FIGS. 11 and 12 illustrate another embodiment of the present invention for remotely actuating the impact tool 37 instead of using the hook 41, spring 42, cable 43, and handle 44, previously discussed. Actuating means 50 is secured to the bracket 27 of the tool cradle 14 by a mounting bracket 54 which is formed with a sleeve 55 to slidably receive a rod 51. Sleeve 55 can be welded to the mounting bracket 54 or cast as a unitary structure with the mounting bracket 54.

The rod 51 has a first end 52 adapted to engage the trigger 39, and a second end 53 which extends upwardly proximate the tip 38 of the impact tool 37. One or both ends 52, 53 of the rod 51 can be adjusted to lengthen or shorten the actuating means 50 so that the trigger 39 is actuated at the proper time. For instance, if the gap between the tip 38 of the impact tool 37 and the second end 53 of the rod 51 is too large, the trigger 39 will not be depressed far enough to cause the fastener to be discharged from the impact tool 37. The rod 51 is held in position relative to the trigger 39 and the tip 38 of the impact tool 39 by a resilient means such as a spring 56.

In operation, the foot-actuated lever 13 is depressed to raise the extendable arm 10 until the tip 38 of the impact tool 37 comes into contact with the ceiling. The operator then depresses the foot-actuated lever 13 further thereby cocking the firing mechanism (not shown) of the impact tool 37. Simultaneously, the rod 51 is forced against the ceiling at its second end 53 thereby causing the first end 52 to depress the trigger 39.

In operation of the extendable arm 10 with the power drill 32 or the impact drill 37 mounted thereon, the operator's body always remains upright. The operator does not have to bend sideways to control the feed of the drill 37 or to operate the impact tool 37. The operator can easily monitor the progress at the ceiling while operating the power or impact tool. Moreover, the operator is able to stabilize the extendable arm 10 with both hands during the entire operation.

The extendable arm 10 is also convenient in situations where an operator must use both a power drill 32 and an impact tool 37. The operator could be provided with one tool cradle 14 having a power drill 32 mounted thereon and a second tool cradle 14 with an impact tool 39 mounted thereon. The operator can then interchange the tools 32 and 37 merely by unlocking the locking collar 19 of the tool cradle 14. Alternatively the operator can unfasten the ring clamps 33 to replace one tool with another.

The embodiments of the invention in which an exclusive property or privilege is claimed are defined as follows:

1. An extendable arm for use by a worker for bringing a tool proximate a ceiling while standing on a floor below said ceiling, said arm comprising:

a telescopic pole having a locking means to hold said pole at a predetermined length;

a tool cradle detachably connected to an upper end of said telescopic pole, said tool cradle having locking means to hold said tool cradle in relative position to said telescopic pole;

securing means to hold a tool in position in said tool cradle; and a foot actuated lever pivoted to a lower end of said telescopic pole, said lever having a leg portion pivoted to said lower end of said telescopic pole, a fulcrum portion bearing directly on the floor, and a pedal portion, said fulcrum portion being positioned between said leg and pedal portions, whereby when said pedal portion is depressed, said telescopic pole and said tool cradle are raised to bring said tool proximate said ceiling.

2. An extendable arm as claimed in claim 1 further comprising a platform attached to said lower end of said telescopic pole.

3. An extendable arm as claimed in claim 1 wherein said telescopic pole is formed of at least two lengths of tubing, one length of tubing having a sliding fit inside a second length of tubing, said at least two lengths of tubing being held in relative position by locking means.

4. An extendable arm as claimed in claim 1 wherein said telescopic pole is formed of at least three lengths of tubing, a first length having a sliding fit inside a second length, and the second length having a sliding fit inside a third length.

5. An extendable arm as claimed in claim 4 wherein said first length of tubing and said second length of tubing and said second length of tubing and third length of tubing are held in relative position by locking means.

6. An extendable arm as claimed in claim 1 wherein said tool is an electric power drill and a switch is mounted on said telescopic pole to connect said power drill to an electrical source.

7. An extendable arm as claimed in claim 1 wherein said tool is an impact tool and further comprising actuating means for remotely actuating said impact tool.

8. An extendable arm as claimed in claim 7 wherein said actuating means is comprised of:

a rod having, a first end engaging the trigger of said impact tool, and a second end extending upwardly proximate the tip of said impact tool, a mounting bracket, said mounting bracket secured to said tool cradle, a sleeve attached to said mounting bracket, said rod slidably received in said sleeve, and resilient means to hold said rod in relative position between the trigger and the tip of said impact tool, whereby when said lever is depressed, said telescopic pole and said tool cradle are raised to bring said tool and said second end of said rod proximate said ceiling, and when said lever is further depressed said rod us moved downwardly against said resilient means to depress the trigger of said impact tool.

9. An extendable arm as claimed in claim 8 wherein said rod is adjustable in length.

10. An extendable arm as claimed in claim 7 wherein said actuating means is comprised of:

a hook engaging the trigger of said impact tool, means for holding said hook in tension, a handle, and means connecting said hook and said handle, whereby when said tool is proximate said ceiling, said handle is pulled downwardly to cause said hook to depress the trigger of said impact tool.

11. An extendable arm as claimed in claim 1, wherein said lever is formed of a single piece of metal tubing, said lever portion having a hole at the end thereof remote from said fulcrum portion, said hole receiving a fastener therethrough, whereby said lever portion is pivoted to said pole, said fulcrum portion comprising a bend in said tubing, and said pedal portion being formed at the end of said tubing remote from said hole.

12. An extendable arm as claimed in claim 11 wherein said foot-actuated lever is substantially U-shaped in profile, one end of said U-shape forming said leg, the other end forming said pedal, and a bend between said leg and said pedal forming said fulcrum for said lever.

* * * * *